(12) United States Patent
Gu

(10) Patent No.: US 12,208,848 B1
(45) Date of Patent: Jan. 28, 2025

(54) BICYCLE PARKING DEVICE WITH ADJUSTABLE LENGTH

(71) Applicant: Haidong Gu, Montclair, CA (US)

(72) Inventor: Haidong Gu, Montclair, CA (US)

(73) Assignee: CYCLINGDEAL USA, INC., CA (US)

( * ) Notice: Subject to any disclaimer, the term of this patent is extended or adjusted under 35 U.S.C. 154(b) by 0 days.

(21) Appl. No.: 18/513,639

(22) Filed: Nov. 20, 2023

(51) Int. Cl.
B62H 3/08 (2006.01)

(52) U.S. Cl.
CPC ........... B62H 3/08 (2013.01); *B62H 2700/00* (2013.01)

(58) Field of Classification Search
CPC ........ B62H 3/04; B62H 3/08; B62H 2700/00; B62H 3/06
USPC ......................................... 211/20, 21, 23, 24
See application file for complete search history.

(56) References Cited

U.S. PATENT DOCUMENTS

| | | | | |
|---|---|---|---|---|
| 511,367 A * | 12/1893 | Slater | ...................... | B62H 3/00 211/23 |
| 529,939 A * | 11/1894 | Noderer | ................... | B62H 3/08 211/20 |
| 556,789 A * | 3/1896 | Walker | ..................... | B62H 3/08 211/20 |
| 556,806 A * | 3/1896 | Chandler | ................ | B62H 3/08 211/20 |
| 557,470 A * | 3/1896 | Young | ...................... | B62H 3/08 211/20 |
| 562,669 A * | 6/1896 | Smart | ...................... | B62H 3/08 211/20 |
| 574,689 A * | 1/1897 | Stover | ..................... | B62H 3/08 211/20 |
| 585,917 A * | 7/1897 | Lang | ......................... | B62H 3/08 211/20 |
| 590,443 A * | 9/1897 | Temple | .................... | B62H 3/04 211/21 |
| D27,769 S * | 10/1897 | Pine | ............................ | D12/115 |
| 603,422 A * | 5/1898 | Burkhardt | ............... | B62H 3/00 211/20 |
| 620,863 A * | 3/1899 | Wilcox | .................... | B62H 3/04 211/21 |
| D36,091 S * | 9/1902 | Merritt | ......................... | D12/115 |

(Continued)

FOREIGN PATENT DOCUMENTS

| | | | | |
|---|---|---|---|---|
| CA | 1222722 A | * | 6/1987 | ............... B62H 3/04 |
| CA | 2507984 A1 | * | 11/2006 | ............... B62H 3/04 |

(Continued)

*Primary Examiner* — Stanton L Krycinski

(57) ABSTRACT

The present invention relates to bicycle parking device with an adjustable length, comprising a base and a positioning component detachably assembled above the base. The positioning component has at least two fixed tubes and a telescopic tube assembly in connection with the fixed tubes. The telescopic tube assembly has at least two first tubes and at least two second tubes pivotally connected with each other. A first positioning point is formed at connection of each of the first tubes with the base. A second positioning point is formed at connection of each of the first tubes with each of the fixed tubes. A third positioning point is formed at connection of each of the fixed tubes with the base. The first, second, and third positioning points provide a stable three-point positioning structure for the positioning component, which enhances stability when a bicycle tire is placed on the positioning component.

8 Claims, 16 Drawing Sheets

(56) References Cited

U.S. PATENT DOCUMENTS

| | | | | |
|---|---|---|---|---|
| D201,143 S * | 5/1965 | Vigilante | ...................... | D12/217 |
| 3,202,289 A * | 8/1965 | Burditt | ...................... | B62H 3/04 |
| | | | | 211/22 |
| 3,348,697 A * | 10/1967 | Saunders | ................ | B62H 3/06 |
| | | | | 211/22 |
| 3,455,461 A * | 7/1969 | Kesling | .................... | B62H 3/06 |
| | | | | 211/171 |
| 3,785,500 A * | 1/1974 | Kennelly | ................ | B62H 3/04 |
| | | | | D12/115 |
| 3,887,075 A * | 6/1975 | Harvey | .................... | B62H 3/00 |
| | | | | 211/5 |
| 4,033,459 A * | 7/1977 | Zach | ....................... | B62H 3/10 |
| | | | | 211/20 |
| D245,596 S * | 8/1977 | Cohen | .......................... | D12/115 |
| D301,217 S * | 5/1989 | Mailhot | ....................... | D12/115 |
| 5,096,068 A * | 3/1992 | Theriault | ................ | B62H 3/04 |
| | | | | 211/20 |
| 5,133,461 A * | 7/1992 | Martinell | ................ | B62H 3/04 |
| | | | | 211/198 |
| D369,576 S * | 5/1996 | Johnson | ....................... | D12/115 |
| 6,062,396 A * | 5/2000 | Eason | ........................ | A47F 7/04 |
| | | | | 211/20 |
| 6,257,419 B1 * | 7/2001 | Kamysiak | ................ | B62H 3/00 |
| | | | | 211/22 |
| 6,868,976 B1 * | 3/2005 | Lassanske | ................ | B62H 3/08 |
| | | | | 211/21 |
| D507,511 S * | 7/2005 | Lassanske | ...................... | D12/115 |
| 6,948,621 B1 * | 9/2005 | Lassanske | ................ | B62H 3/06 |
| | | | | 211/21 |
| D583,716 S * | 12/2008 | Ross | ............................ | D12/115 |
| D602,403 S * | 10/2009 | Shaha | .......................... | D12/115 |
| 8,342,339 B2 * | 1/2013 | Cole | ........................ | B62H 3/04 |
| | | | | 211/22 |
| D719,491 S * | 12/2014 | Rayl | ............................ | D12/115 |
| D719,492 S * | 12/2014 | Rayl | ............................ | D12/115 |
| 8,905,245 B2 * | 12/2014 | Long | ........................ | B62H 3/04 |
| | | | | 211/20 |
| 8,944,258 B2 * | 2/2015 | Chiu | ........................ | B62H 3/06 |
| | | | | 211/195 |
| D778,788 S * | 2/2017 | Tsai | ............................ | D12/115 |
| 9,592,868 B2 * | 3/2017 | Greenblatt | ................ | B62H 3/06 |
| 9,610,993 B1 * | 4/2017 | Ho | .......................... | B62H 3/06 |
| 9,649,986 B2 * | 5/2017 | Pedrini | ..................... | B60R 9/10 |
| 9,650,092 B1 * | 5/2017 | Tsai | ........................ | B62H 3/08 |
| D863,117 S * | 10/2019 | Rossiter | ....................... | D12/115 |
| 10,858,055 B2 * | 12/2020 | Drew | ........................ | B62K 3/14 |
| 11,008,060 B1 * | 5/2021 | Liu | ........................ | B62H 3/10 |
| 11,117,631 B2 * | 9/2021 | Gu | .......................... | B62H 3/08 |
| 11,312,438 B1 * | 4/2022 | Gu | .......................... | B62H 3/08 |
| 11,505,267 B1 * | 11/2022 | Gu | .......................... | B62H 3/04 |
| 11,708,120 B1 * | 7/2023 | Striebel | .................... | B62H 3/12 |
| | | | | 211/21 |
| 11,839,966 B1 * | 12/2023 | Helmrich | ............ | B25H 1/0014 |
| 2003/0010729 A1 * | 1/2003 | Lopez De Luzuriaga | ................ | |
| | | | | B62H 3/04 |
| | | | | 211/17 |
| 2004/0251219 A1 * | 12/2004 | Zimmerman | ............ | B62H 3/08 |
| | | | | 211/17 |
| 2006/0266717 A1 * | 11/2006 | Tsai | ........................ | B62H 3/00 |
| | | | | 211/17 |
| 2007/0164065 A1 * | 7/2007 | Davis | ........................ | B60R 9/10 |
| | | | | 224/324 |
| 2008/0000848 A1 * | 1/2008 | Chiu | ........................ | B62H 3/04 |
| | | | | 211/21 |
| 2013/0264297 A1 * | 10/2013 | Long | ........................ | B62H 3/04 |
| | | | | 211/20 |
| 2015/0360739 A1 * | 12/2015 | Ashlag | ..................... | B62H 3/02 |
| | | | | 211/5 |
| 2017/0120974 A1 * | 5/2017 | Peruzzo | ................... | B62H 3/06 |
| 2020/0047833 A1 * | 2/2020 | Drew | ........................ | B62K 3/14 |
| 2023/0192205 A1 * | 6/2023 | Rasmussen | ............ | B62H 3/04 |
| | | | | 211/20 |
| 2024/0083534 A1 * | 3/2024 | Hoadley | ................. | B60P 3/077 |

FOREIGN PATENT DOCUMENTS

| | | | |
|---|---|---|---|
| CH | 712798 A2 * | 2/2018 | ............... B62H 3/04 |
| DE | 29607760 U1 * | 7/1996 | ............... B62H 3/04 |
| EP | 1555194 A1 * | 7/2005 | ............... B62H 3/04 |
| EP | 3275771 B1 * | 4/2019 | ............... B62H 3/04 |

* cited by examiner

BICYCLE PARKING DEVICE WITH ADJUSTABLE LENGTH

BACKGROUND OF THE INVENTION

Fields of the Invention

The present invention relates to a technical field of parking devices and, more particularly to, a bicycle parking device with an adjustable length.

Descriptions of Related Art

In order to maintain the aesthetics of bicycles and prevent the frame from being scratched or damaged, most bicycles are not equipped with kickstands. When bicycles need to be parked, they are usually leaned against a wall or laid flat on the ground, which may lead to frame damage.

Furthermore, bicycles parked in this manner cannot be neatly arranged, and collisions and toppling may occur while parking or when exiting the parking area. In contrast, setting up parking racks on the ground provides spaced arrangement of bicycles, reducing the aforementioned problems.

SUMMARY OF THE INVENTION

The present invention provides a bicycle parking device with an adjustable length. The primary objective is to provide a positioning component with adjustable features to accommodate bicycles of different tire diameters, enabling bicycles to be neatly arranged without collisions during parking or when moving out of the parking area.

To achieve the aforementioned objective, the present invention provides a bicycle parking device with an adjustable length, which comprises: a base; and a positioning component, detachably assembled above the base. The positioning component has at least two fixed tubes and a telescopic tube assembly in connection with one end of each of the at least two fixed tubes. The telescopic tube assembly has at least two first tubes and at least two second tubes pivotally interconnected with the at least two first tubes. A first positioning point is formed at connection of one end of each of the at least two first tubes with the base. A second positioning point is formed at one end of each of the two at least two second tubes, situated apart from the first positioning point. A third positioning point is formed at connection of one end of each of the at least two fixed tubes with the base. As such, the positioning component provides a stable structure for placing a wheel by the first positioning point, the second positioning point and the third positioning point.

In the present invention, the bicycle parking device further comprises at least two wheel support members connected to one end of each of the first tubes and one end of each of the fixed tubes, respectively.

In the present invention, each of the at least two wheel support members has two assembly sections and a supporting section connecting between the two assembly sections. The supporting section has a tire support groove. The tire support groove has a narrow tire-receiving hole and a wide tire-receiving hole. The supporting section has an inner side and an outer side arranged in opposite directions. Both of the inner side and the outer side are non-continuous flat surfaces. The outer side is formed with a reinforcing recess extending from the outer side toward the inner side. The inner side is equipped with a reinforcing protrusion extending toward the reinforcing recess in an opposite direction.

DETAILED DESCRIPTION OF THE PREFERRED EMBODIMENT

Figure 1:
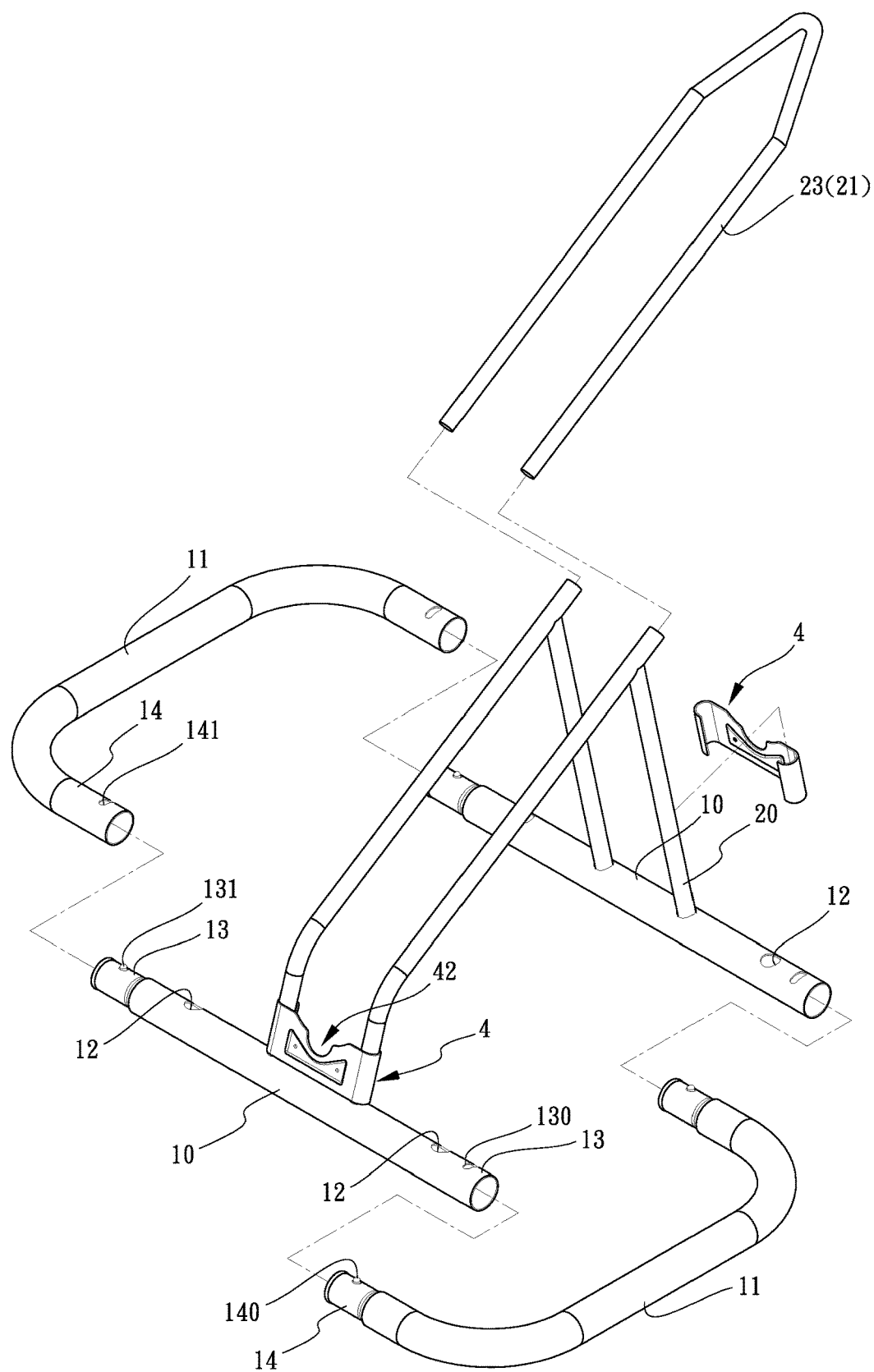
FIG. 1 is an exploded perspective view of the first embodiment of the present invention.
Figure 2:
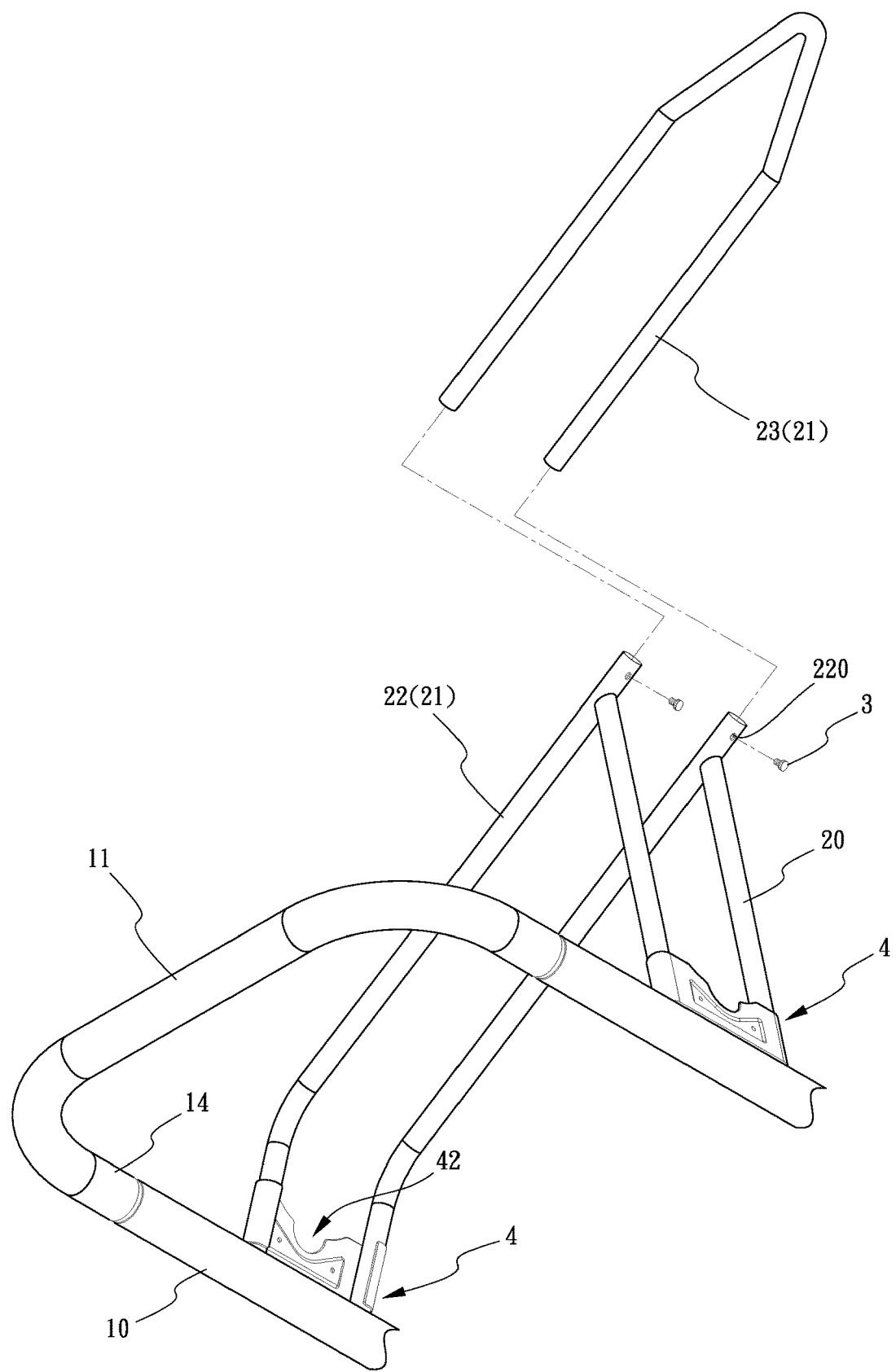
FIG. 2 is a partially exploded perspective view from another angle of the first embodiment of the present invention.
Figure 3:
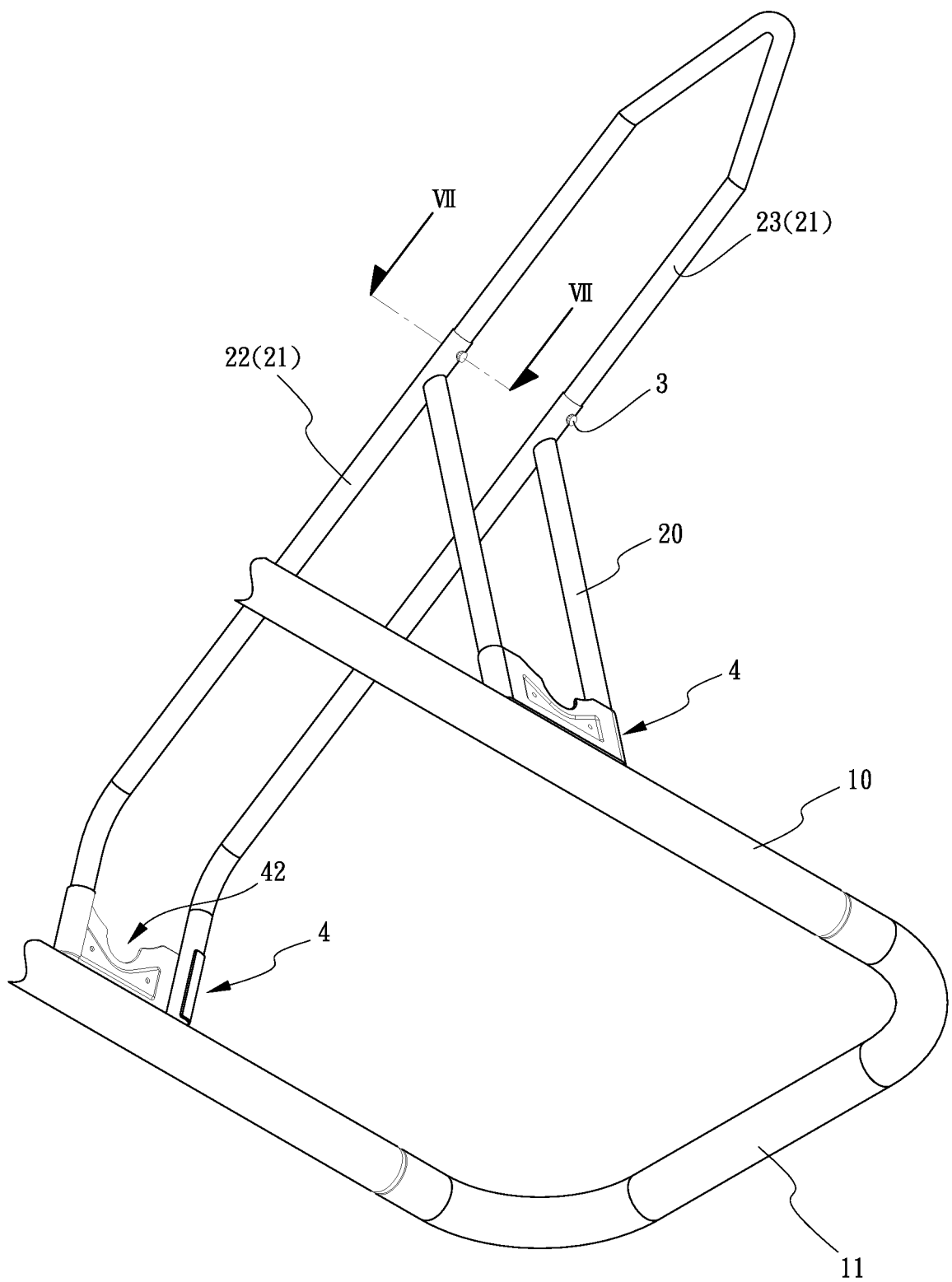
FIG. 3 is a partially assembled perspective view from another angle of the first embodiment of the present invention.
Figure 4:
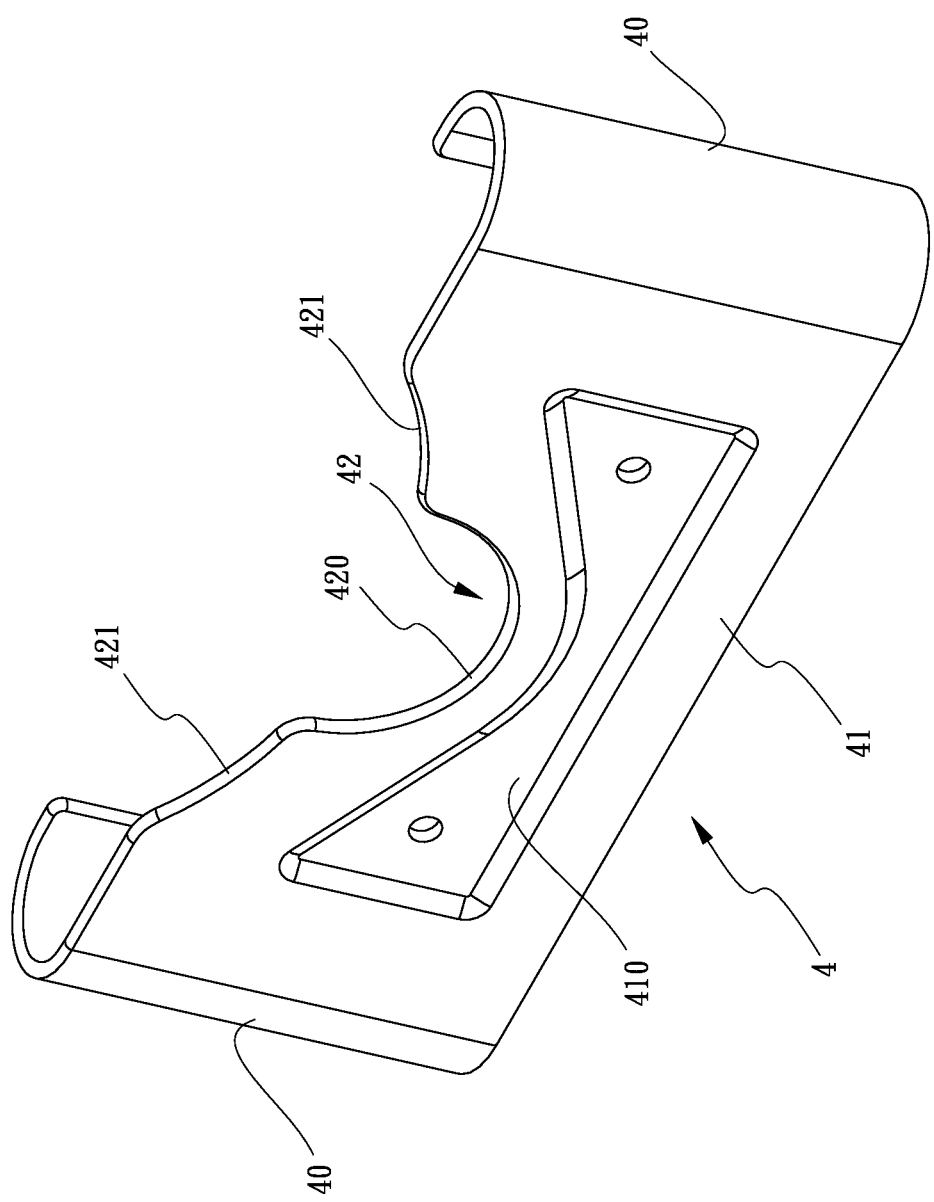
FIG. 4 is a perspective view of a wheel support member of the first embodiment of the present invention.
Figure 5:
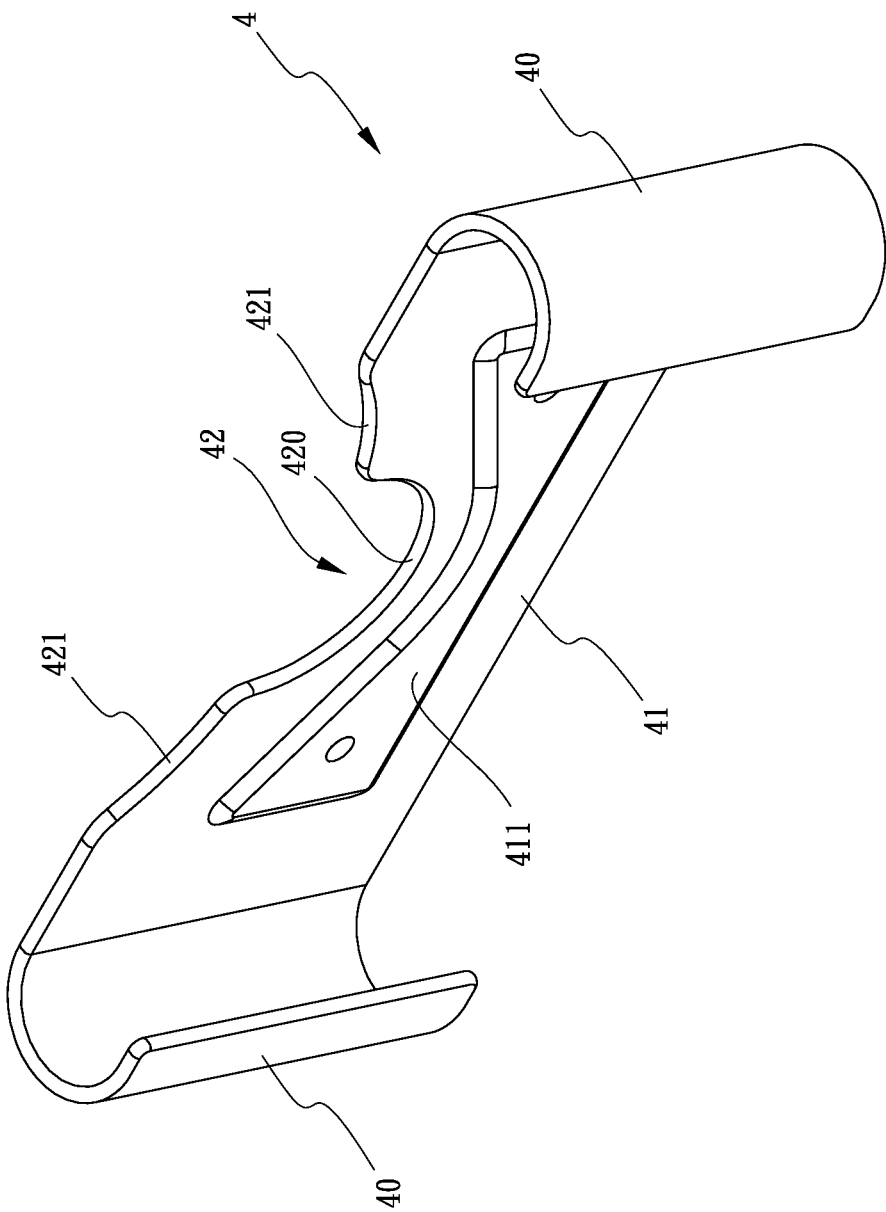
FIG. 5 is a perspective view from another angle of a wheel support member of the first embodiment of the present invention.
Figure 6:
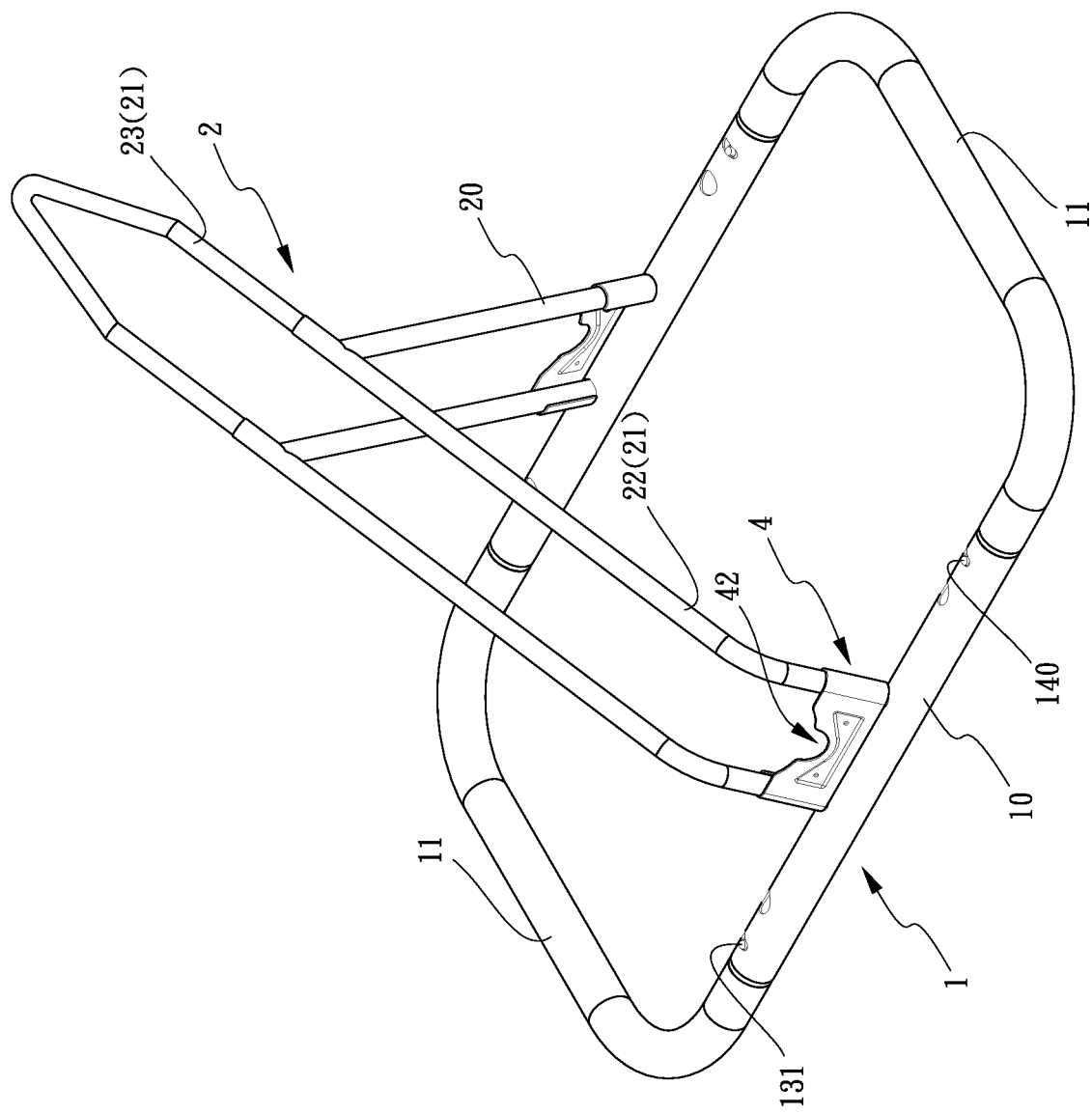
FIG. 6 is an assembled perspective view of the first embodiment of the present invention.
Figure 11:
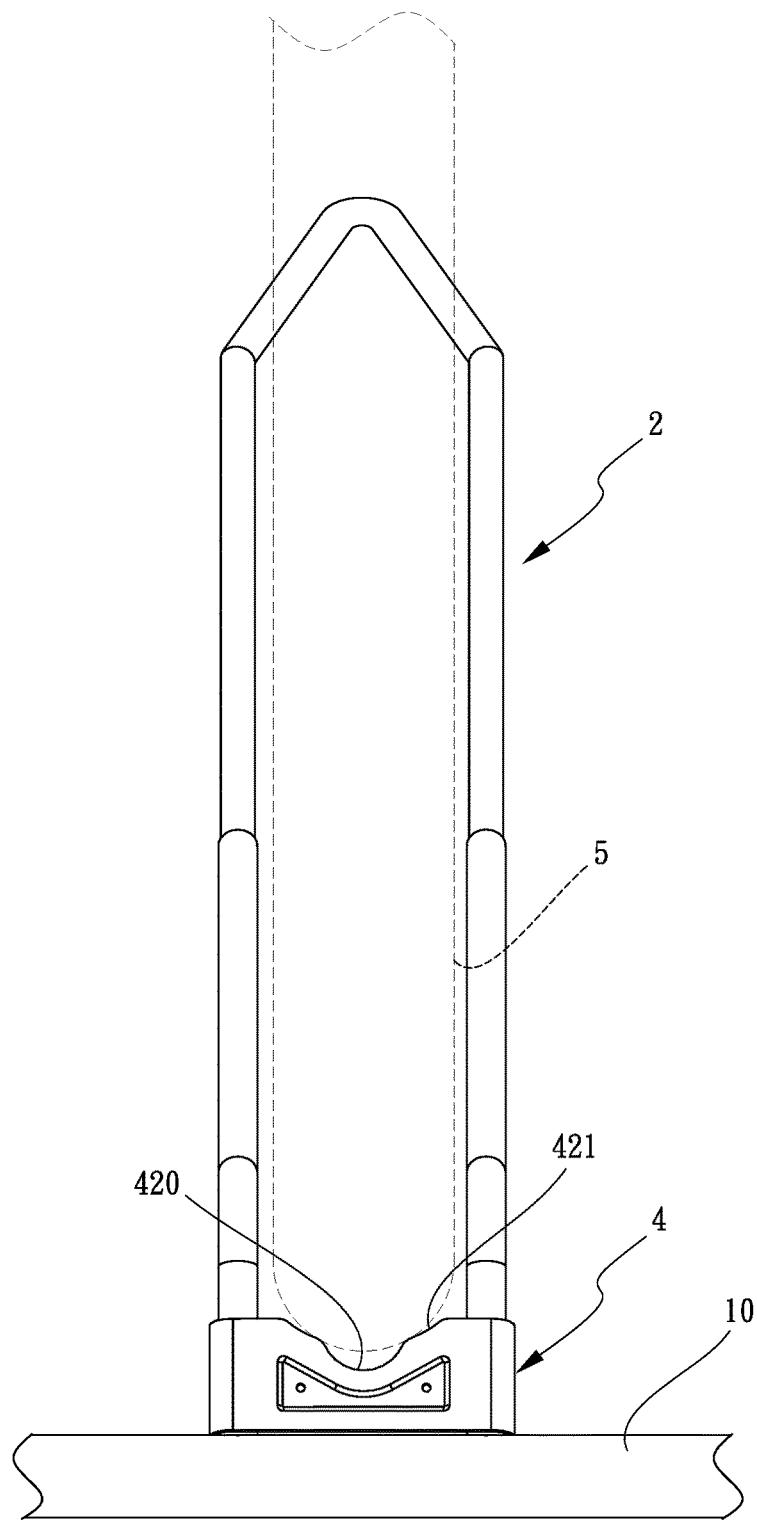
FIG. 11 is a plan schematic view of a wheel placed in a wide tire-receiving hole in the first embodiment of the present invention.
Figure 12:
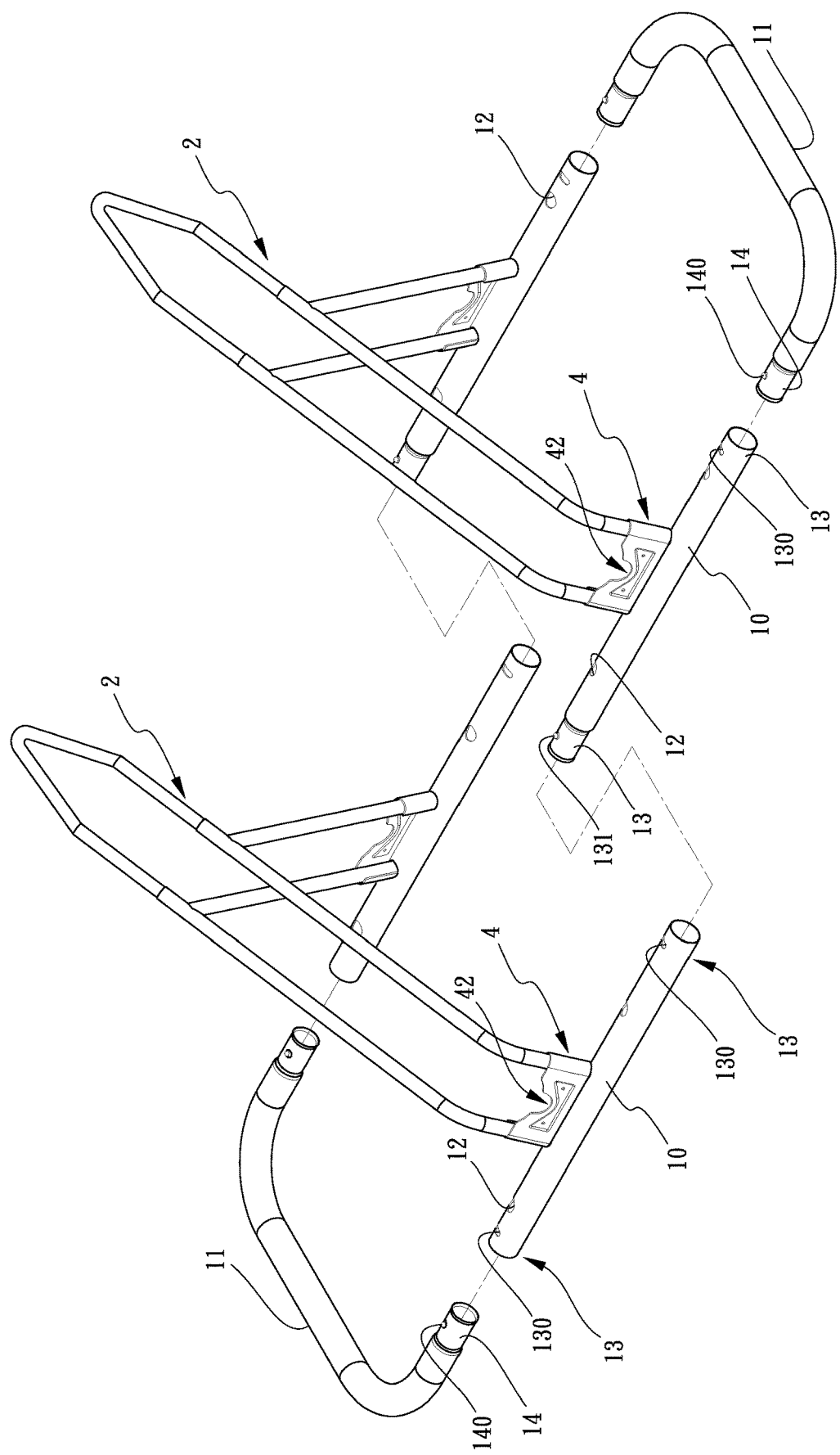
FIG. 12 is an exploded perspective view of the second embodiment of the present invention.

As shown in FIGS. 1 to 16, the present invention provides a bicycle parking device with an adjustable length, which includes: a base 1, having at least two long side tubes 10 and at least two short side tubes 11. Each of the long side tubes 10 has a plurality of adjustment holes 12 and has first connecting parts 13 at both ends, respectively. Both ends of each of the short side tubes 11 are formed with second connecting parts 14, respectively, corresponding to the first connecting parts 13. The two first connecting parts 13 and the two second connecting parts 14 are detachably assembled. In this embodiment, the two first connecting parts 13 and the two second connecting parts 14 can be assembled in different configurations. For example, if both the two first connecting parts 13 individually have a first perforation 130, then both the two second connecting parts 14 individually have a first elastic button 140 corresponding to the first perforation 130 (as shown in FIG. 12). In another instance, if the two first connecting parts 13 respectively have a first perforation 130 and a second elastic button 131, then the two second connecting parts 14 respectively have a first elastic button 140 corresponding to the first perforation 130 and a second perforation 141 corresponding to the second elastic button 131 (as shown in FIG. 1).

Figure 13:
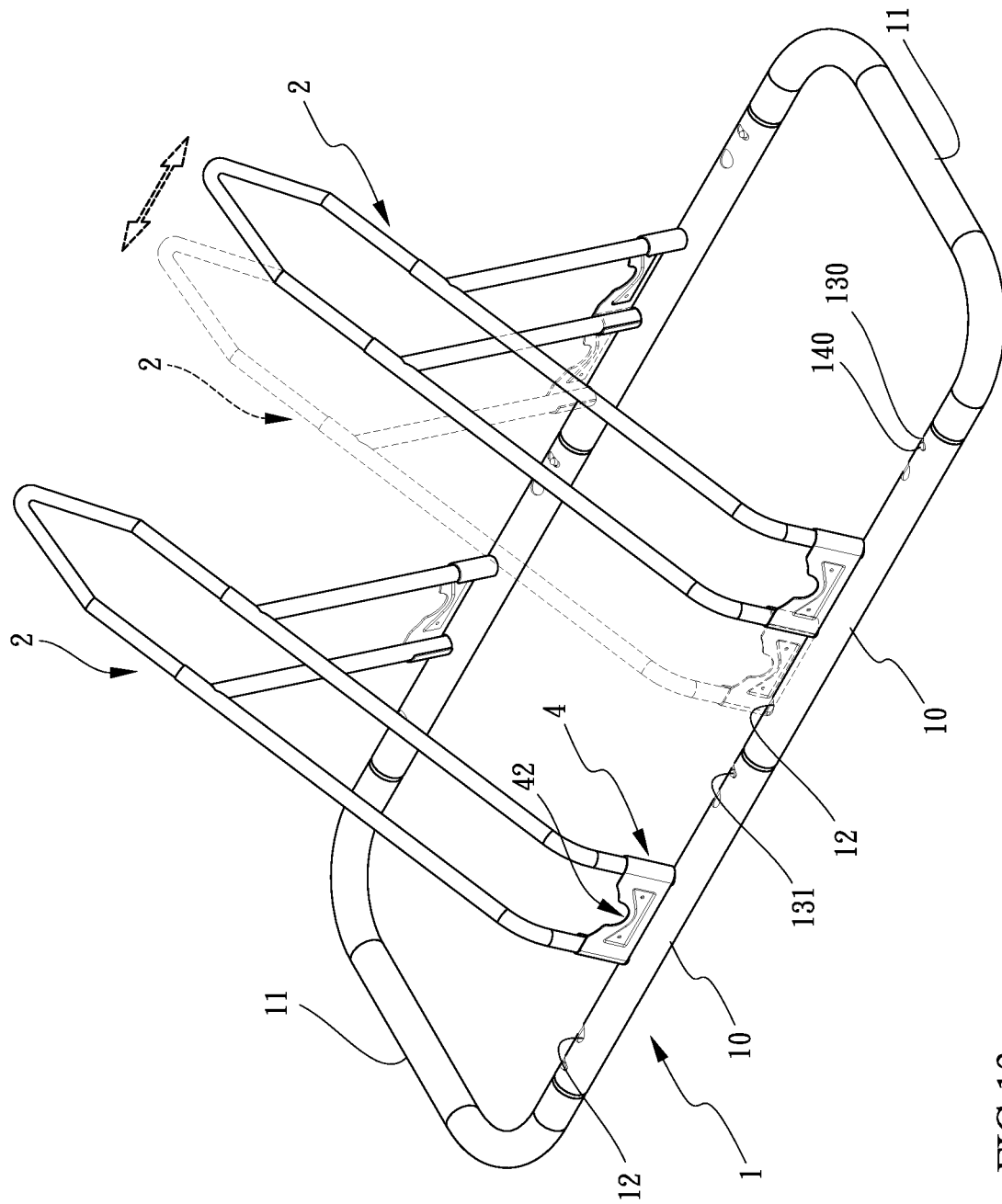
FIG. 13 is an assembled assembly view of the second embodiment of the present invention.

From the above explanation, it can be understood that the first connecting parts of each of the long side tubes may each have a first perforation 130 or a second elastic button 131. One first connecting part 13 for one of the long side tubes 10 and the other first connecting part 13 for the other one of the long side tubes 10 can be secured by using the first perforation 130 and the second elastic button 13, achieving the effect of combining a plurality of long side tubes 10 to expand the size of the base 1 according to the number of parked bicycles (as shown in FIGS. 12 and 13).

Figure 7:
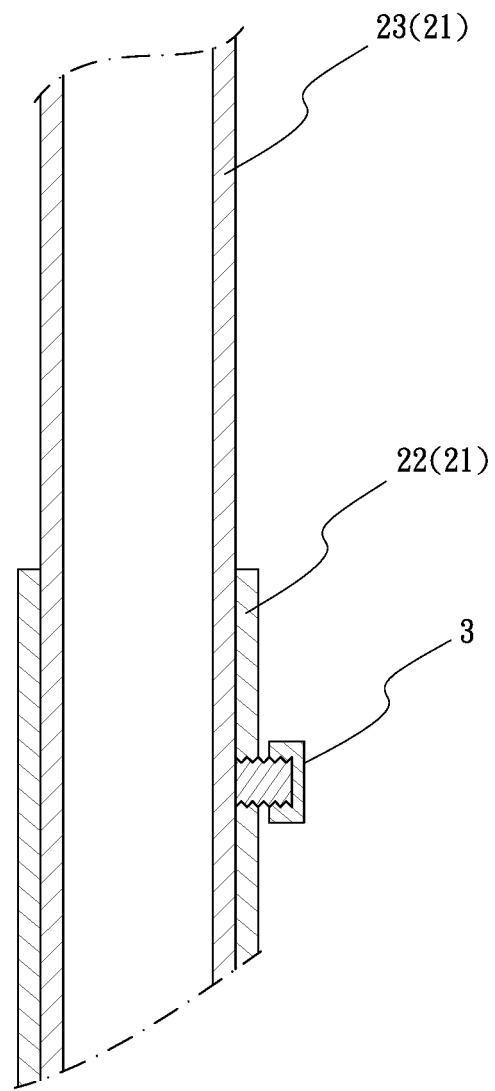
FIG. 7 is a cross-sectional view taken along the line VII-VII of FIG. 3 of the present invention.

The bicycle parking device further includes a positioning component 2 detachably assembled above the two long side tubes 10 of the base 1. Furthermore, the positioning component 2 has at least two fixed tubes 20 and a telescopic tube assembly 21 in connection with the two fixed tubes 20. The telescopic tube assembly 21 has at least two first tubes 22 and at least two second tubes 23 pivotally interconnected with the two first tubes 22. Each of the two fixed tubes 20 and the two first tubes 22 has one end detachably connected to a respective one of the adjustment holes 12 of the long side tubes 10 of the base 1. Each of the first tubes 22 has a first positioning hole 220, through which a positioning member 3 is detachably inserted and abuts against an outer tube wall of a respective one of the second tubes 23 (as shown in FIG. 7). As such, the first tubes 22 and the second tubes 23 can form a stepless telescopic structure. In this embodiment, in addition to the manner of abutting and forcing the positioning member against the outer tube wall of the second tube 23, the stepless telescopic structure may employ other configurations, such as a quick-release structure, elastic buttons structure, or rod-and-roller structure.

Figure 10:
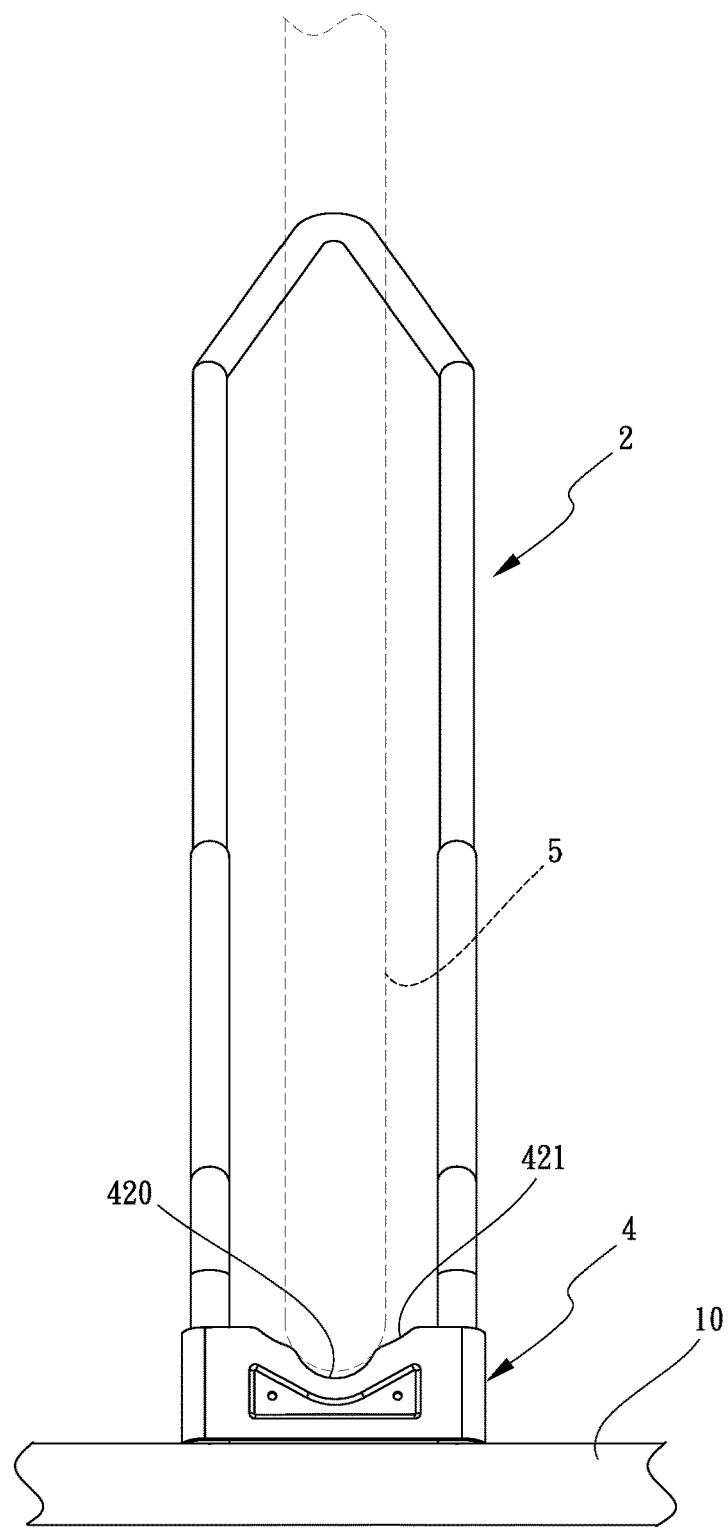
FIG. 10 is a plan schematic view of a wheel placed in a narrow tire-receiving hole in the first embodiment of the present invention.

The bicycle parking device further includes at least two wheel support members 4, which are detachably connected to one end of each of the first tubes 22 and one end of each of the fixed tubes 20 and each have a bottom supported on a respective one of the two long side tubes 10 of the base 1. Additionally, each of the wheel support members 4 has two assembly sections 40 and a supporting section 41 connecting between the two assembly sections 40. The supporting section 41 has a tire support groove 42. The tire support groove 427 has a narrow tire-receiving hole 420 and a wide tire-receiving hole 421. The narrow tire-receiving hole 420 provides parking and positioning space for a smaller wheel of road bikes, folding bikes, or cruiser bikes, for example (as shown in FIG. 10), while the wide tire-receiving hole 421 provides parking and positioning space for a wider wheel of mountain bikes, for example (as shown in FIG. 11). Moreover, the supporting section 41 has an inner side and an outer side arranged in opposite directions. Both the inner side and the outer side are non-continuous flat surfaces. The outer side is formed with a reinforcing recess 410 extending from the outer side toward the inner side. The inner side is equipped with a reinforcing protrusion 411 extending toward the reinforcing recess 410 in the opposite direction. In particular, the positioning component 2 has a tubular structure, the wheel support members 4 have a sheet-like structure, and the assembly sections 40 of the wheel support members 4 have a curved arc-shaped opening. Accordingly, the tubular structure of the positioning component 2 can be inserted and secured into the opening of the assembly section 40 during installation, making the installation operation of the wheel support members 4 and the positioning component 2 quite simple.

Figure 14:
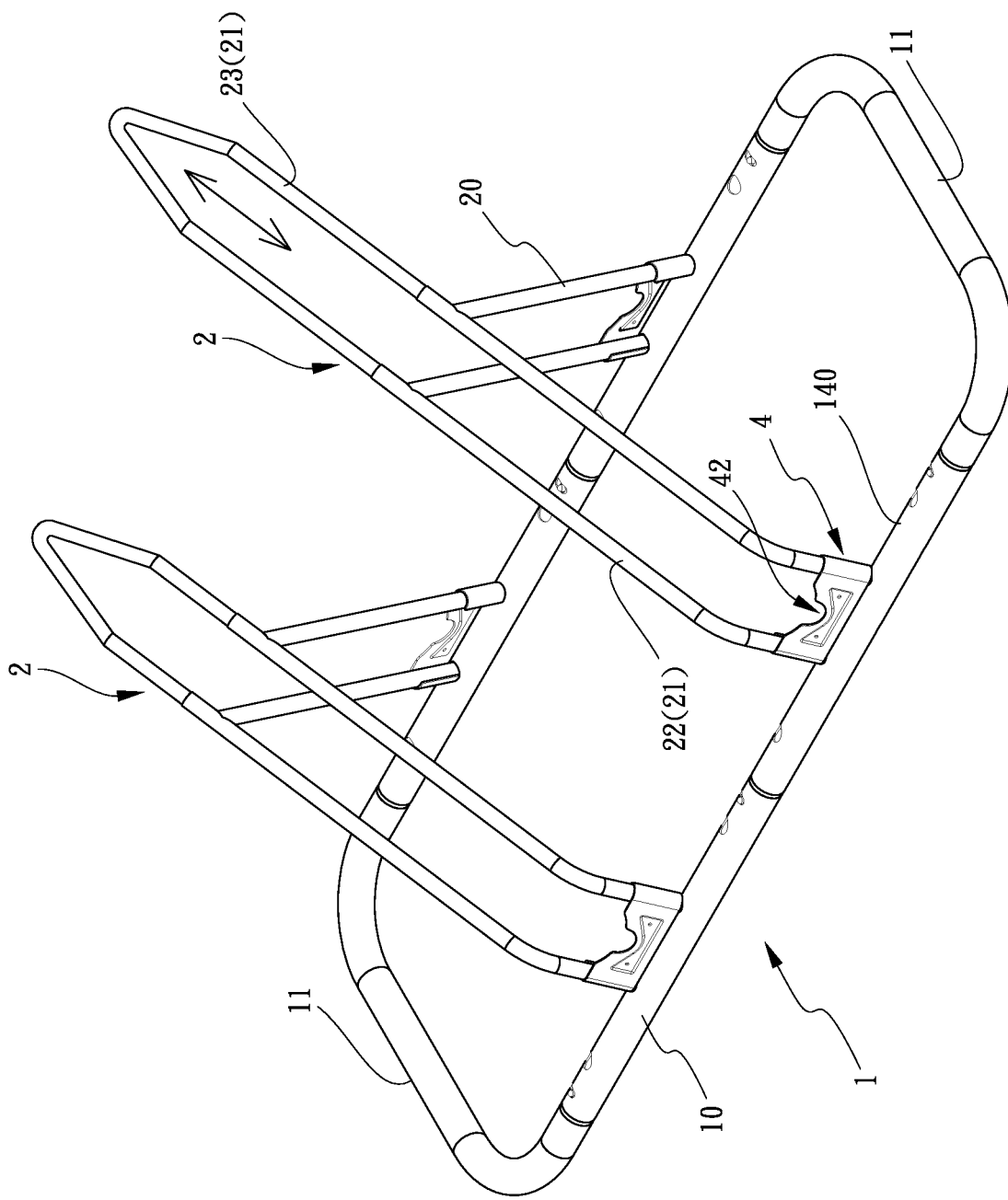
FIG. 14 is a schematic view of adjusting a telescopic tube assembly in the second embodiment of the present invention.
Figure 15:
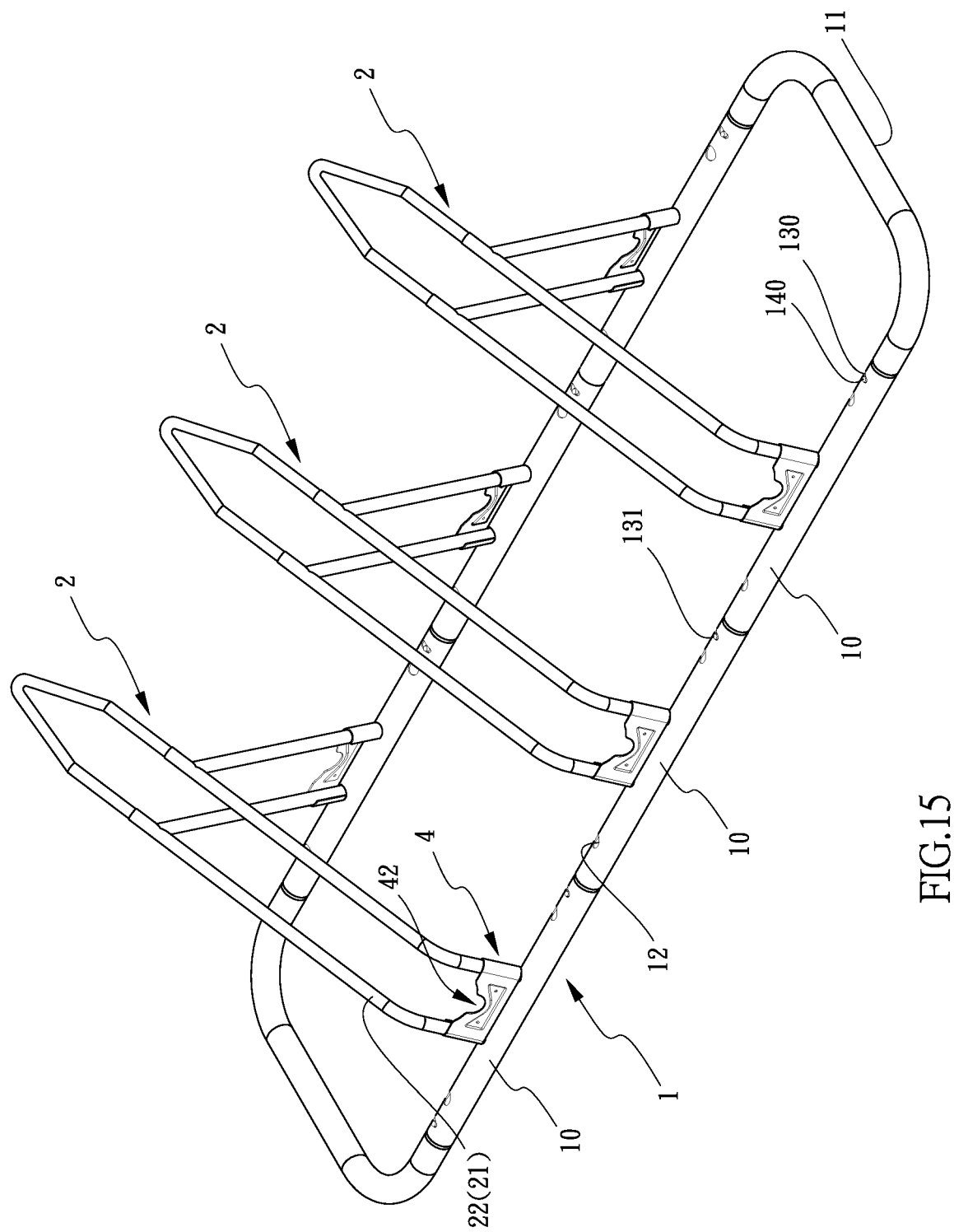
FIG. 15 is a perspective view of the third embodiment of the present invention.
Figure 16:
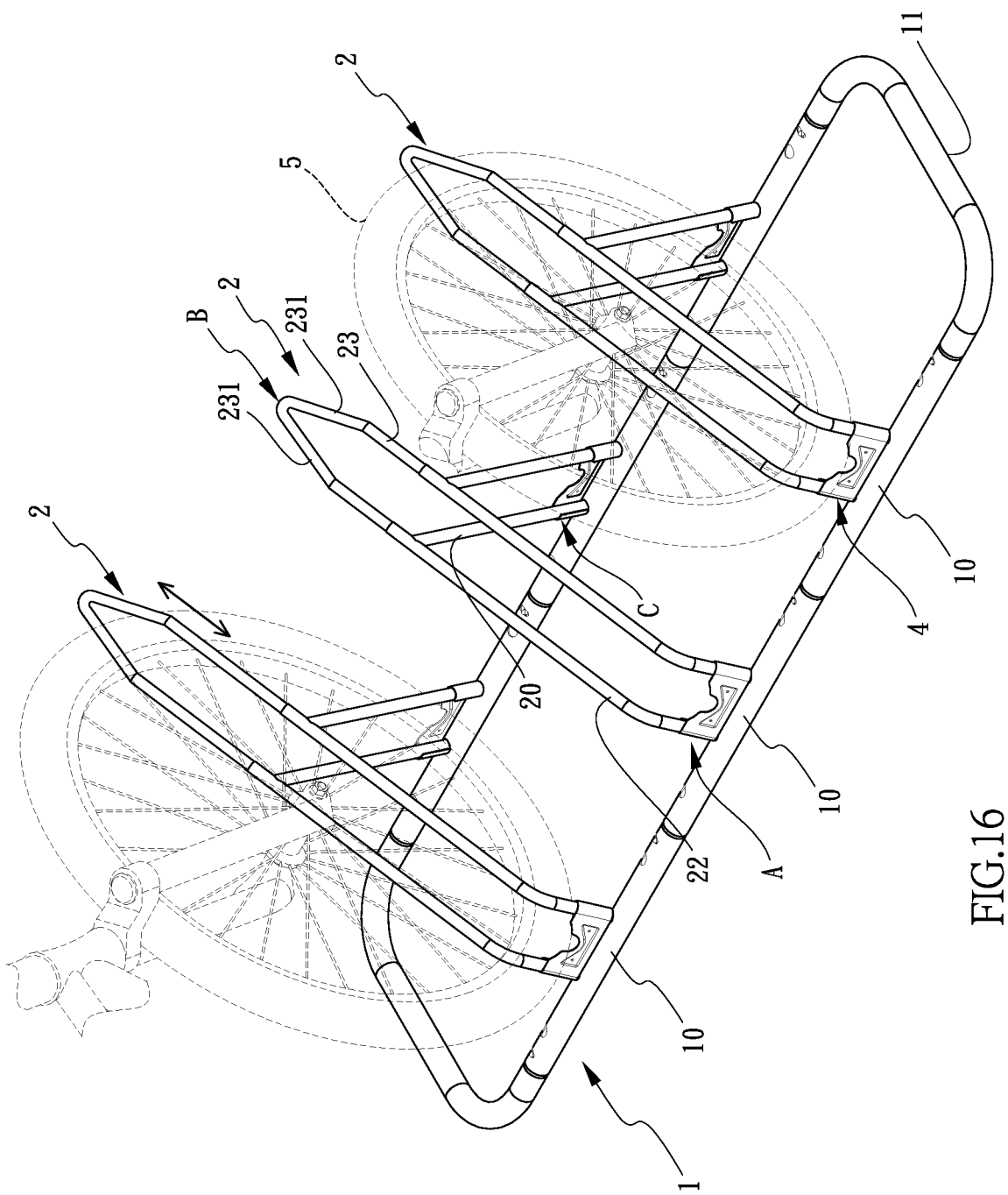
FIG. 16 is a schematic view of placing a bicycle wheel in the third embodiment of the present invention.

From the above explanation, it can be understood that by simply installing the wheel support members 4 on the positioning component 2 and then installing the positioning component 2 on the base 1, the assembly of the bicycle parking device of the present invention can be easily completed, allowing one wheel 5 of a bicycle to be positioned across the parking space without direct contact with the ground. In this embodiment, the positioning component 2 and the wheel support members 4 of the present invention can be provided for the front wheel or the rear wheel of a bicycle depending on the actual situation. However, when it is desired to place a plurality of bicycles, in order to avoid collisions between the handlebars of the bicycles due to the close proximity of the two positioning components 2, an appropriate distance can be provided between the two positioning components 2 by using the plurality of adjustment holes 12 of the long side tubes 10 (as shown in FIG. 14).

Figure 8:
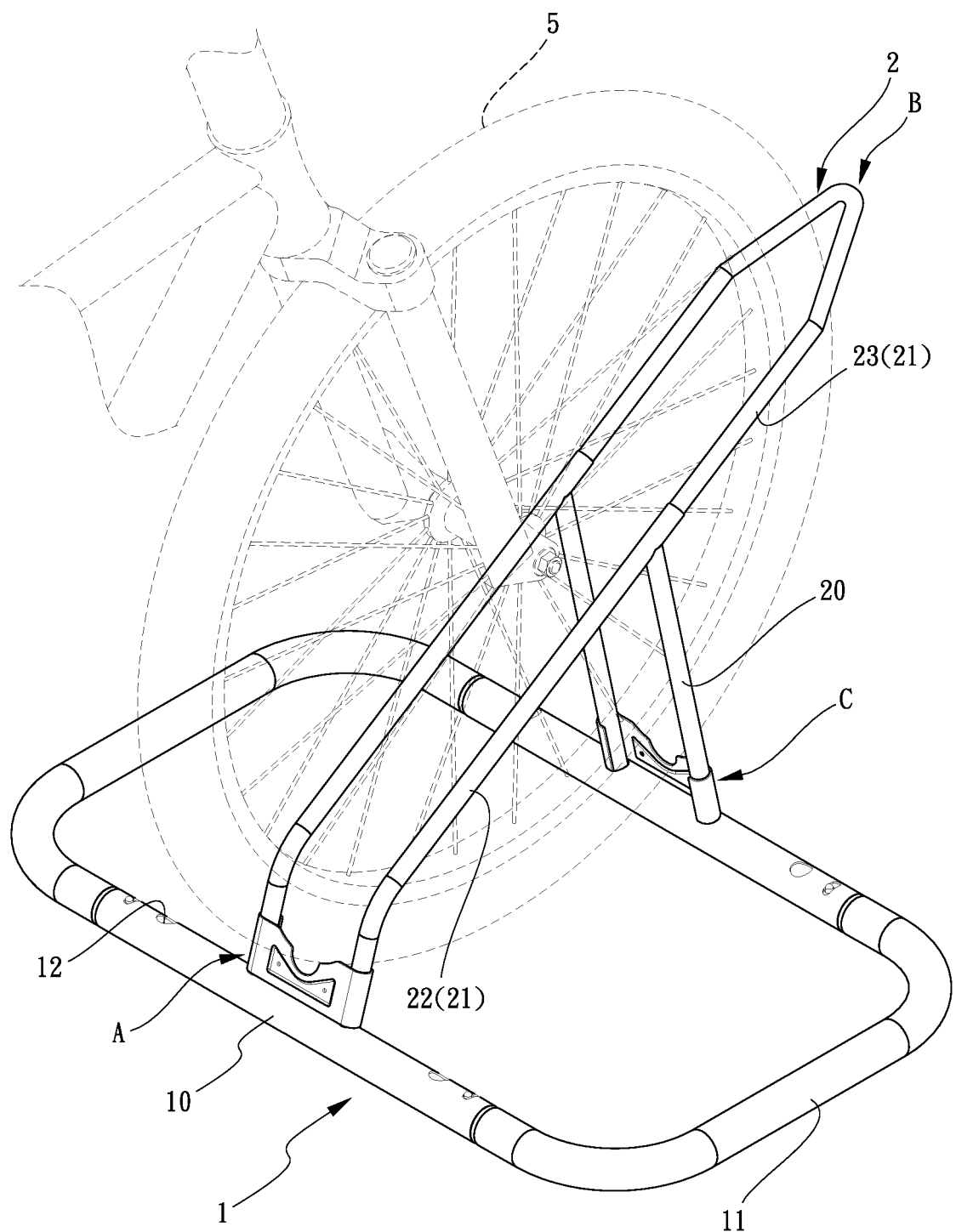
FIG. 8 is a perspective schematic view of placing a bicycle wheel in the first embodiment of the present invention.
Figure 9:
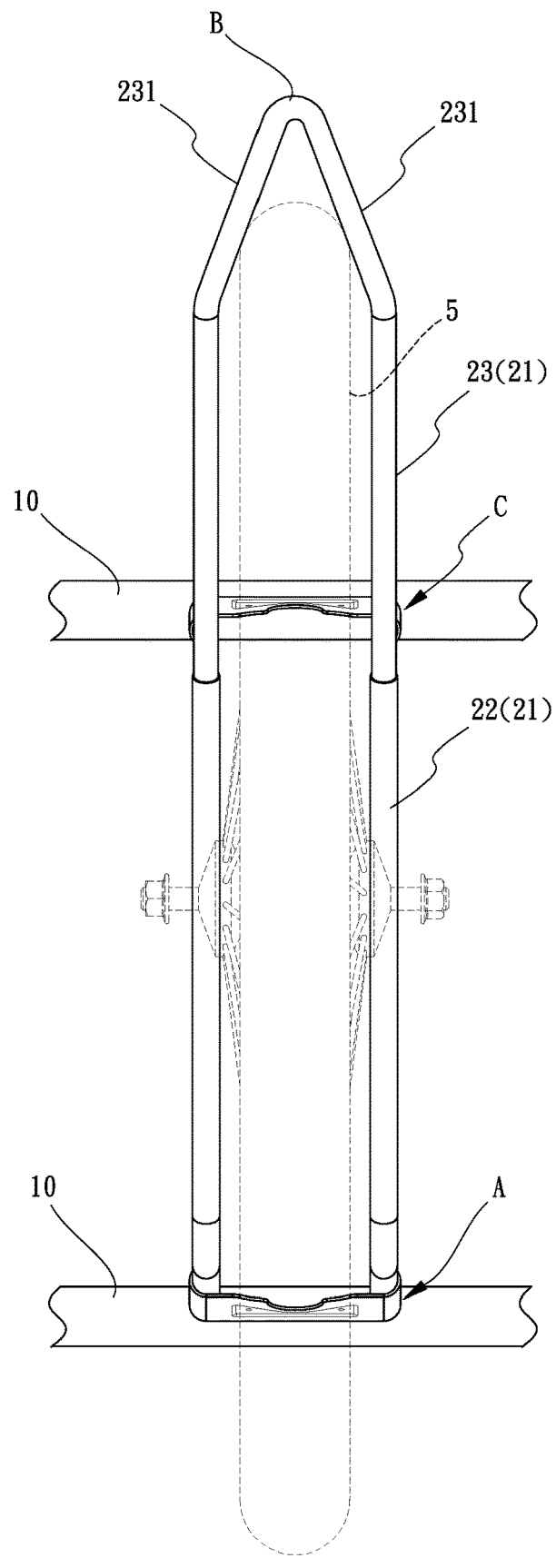
FIG. 9 is a top plan view of placing a bicycle wheel in the first embodiment of the present invention.

Furthermore, as shown in FIGS. 8 and 9, by the first positioning point A formed at the connection of the first tubes 22 with the base 1, the second positioning point B formed at the connection of two oblique tubes 231 each extending from one end of a respective one of the two second tubes 23 and the third positioning point C formed at the connection of the fixed tubes 20 with the base 1, a three-point positioning structure formed by the first positioning point A, the second positioning point B, and the third positioning point C provides a stable structure for the positioning member 2 to place the wheel 5.

It is worth noting that the telescopic tube assembly 21 of the present invention can adjust its length to accommodate different sizes of wheels 5. When the parked wheel 5 is smaller in size, the first tubes 22 and the second tubes 23 are in a contracted state. When the parked wheel 5 is larger in size, the first tubes 22 and the second tubes 23 are in an extended state. In other words, by adjusting the telescopic tube assembly 21 to a contracted or extended state, it can accommodate different sizes of wheels 5 and prevent damage during the process of parking or moving out, avoiding collisions with a hub or brake disc of the front wheel, or with a cassette or derailleur of the rear wheel.

What is claimed is:

1. A bicycle parking device with an adjustable length, comprising:
   a base; and
   a positioning component, detachably assembled above the base, wherein the positioning component has at least two fixed tubes and a telescopic tube assembly in connection with one end of each of the at least two fixed tubes, and the telescopic tube assembly has at least two first tubes, each with a first positioning hole, and at least two second tubes each telescopically interconnected with a respective one of the at least two first tubes by allowing a positioning member to be detachably inserted through the first positioning hole and to abut against a tube wall of a respective one of the at least two second tubes;
   wherein a first positioning point is formed at a connection of one end of each of the at least two first tubes with the base, a second positioning point is formed at one end of each of the two at least two second tubes, situated apart from the first positioning point, and a third positioning point is formed at a connection of one end of each of the at least two fixed tubes with the base, so that the positioning component provides a stable structure for placing a wheel by the first positioning point, the second positioning point and the third positioning point.

2. The bicycle parking device with an adjustable length as claimed in claim 1, wherein the at least two second tubes have two oblique tubes each extending from one end thereof corresponding to the second positioning point, and the two oblique tubes clamp onto both sides of the wheel.

3. The bicycle parking device with an adjustable length as claimed in claim 1, further comprising at least two wheel support members connected to one end of each of the first tubes and one end of each of the fixed tubes, respectively.

4. The bicycle parking device with an adjustable length as claimed in claim 3, wherein (i) each of the at least two wheel support members has two assembly sections and a supporting section connecting between the two assembly sections, (ii) the supporting section has a tire support groove, (iii) the tire support groove has a first tire-receiving hole and a second tire-receiving hole wider than the first tire-receiving hole, (iv) the supporting section has an inner side and an outer side arranged in opposite directions, (v) both of the inner side and the outer side are non-continuous flat surfaces, (vi) the outer side is formed with a reinforcing recess extending from the outer side toward the inner side, and (vii) the inner side is equipped with a reinforcing protrusion extending toward the reinforcing recess in an opposite direction.

5. The bicycle parking device with an adjustable length as claimed in claim 1, wherein (i) the base has at least two long side tubes and at least two short side tubes configured to be assembled and disassembled with each other, (ii) each of the at least two long side tubes has a plurality of adjustment holes and has first connecting parts at both ends, respectively, (iii) both ends of each of the at least two short side tubes are each formed with a second connecting part, and (iv) the two first connecting parts are detachably assembled with the two second connecting parts.

6. The bicycle parking device with an adjustable length as claimed in claim 5, wherein each of the two first connecting parts has a first perforation, and each of the two second connecting parts has a first elastic button corresponding to the first perforation.

7. The bicycle parking device with an adjustable length as claimed in claim 5, wherein the two first connecting parts respectively have a first perforation and a second elastic button, and the two second connecting parts respectively have a first elastic button corresponding to the first perforation and a second perforation corresponding to the second elastic button.

8. The bicycle parking device with an adjustable length as claimed in claim 5, wherein each of the at least two fixed tubes and the at least two first tubes has one end connected with a respective one of the adjustment holes of the at least two long side tubes.

* * * * *